(No Model.) 2 Sheets—Sheet 2.
L. GUTMANN.
ALTERNATING CURRENT MOTOR REGULATOR.
No. 419,664. Patented Jan. 21, 1890.
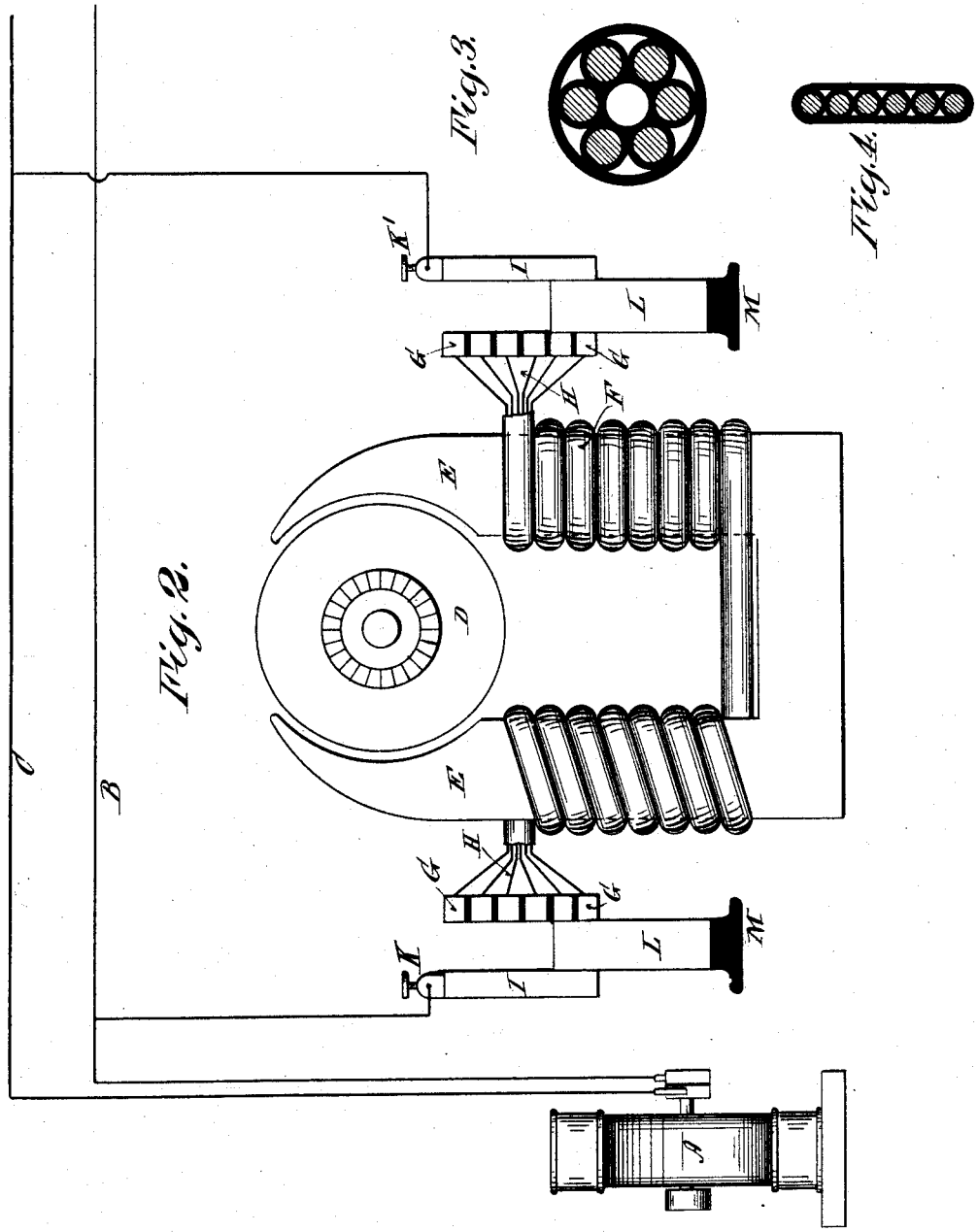
Witnesses:
D. W. Gardner
Nellie L. Pope.
Inventor:
Ludwig Gutmann,
By his Attorney
Edward P. Thompson

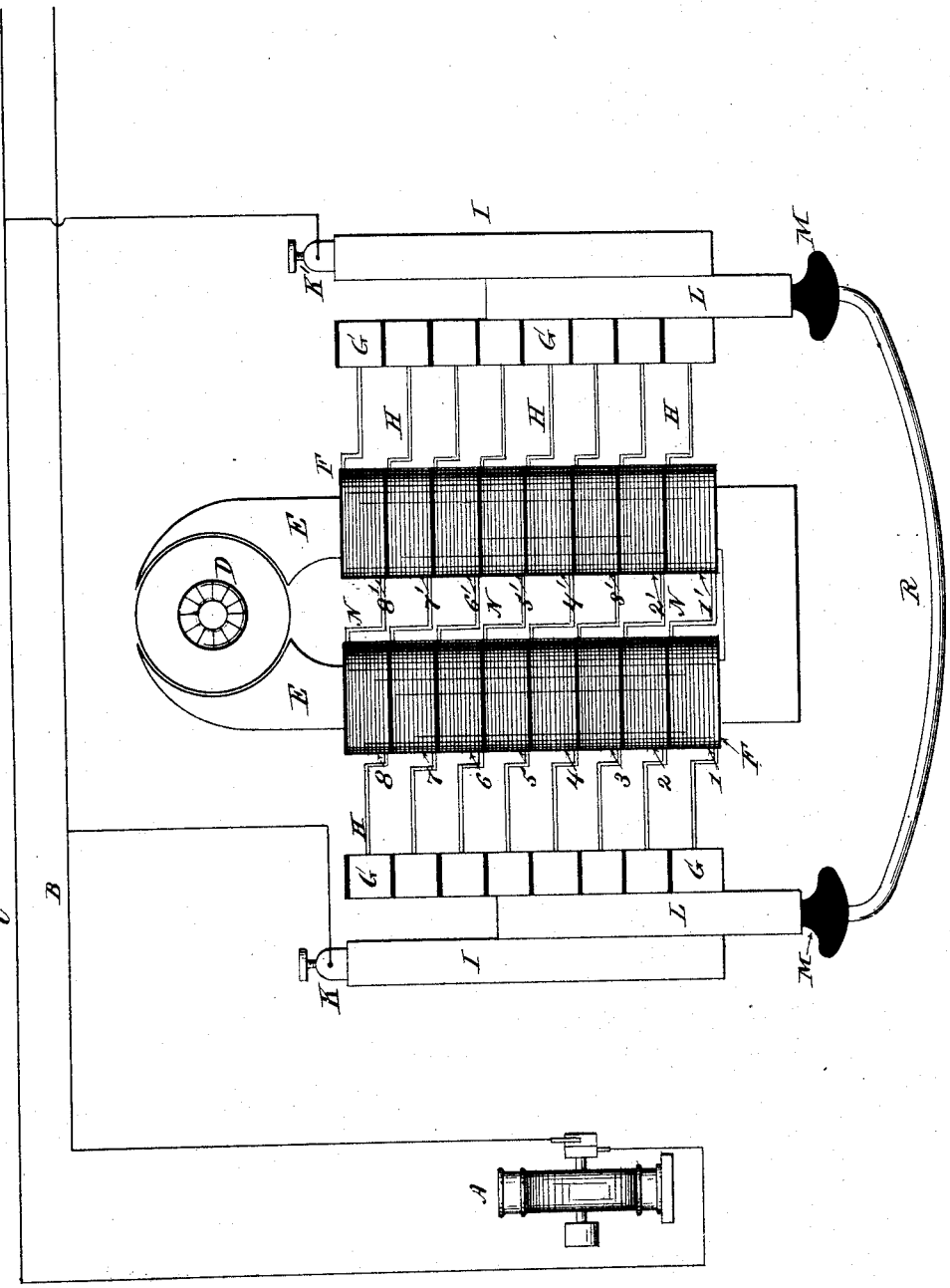

UNITED STATES PATENT OFFICE.

LUDWIG GUTMANN, OF FORT WAYNE, INDIANA.

ALTERNATING-CURRENT-MOTOR REGULATOR.

SPECIFICATION forming part of Letters Patent No. 419,664, dated January 21, 1890.

Application filed February 23, 1889. Serial No. 300,794. (No model.)

*To all whom it may concern:*

Be it known that I, LUDWIG GUTMANN, a subject of the Emperor of Germany, and a resident of Fort Wayne, in the county of Allen and State of Indiana, have invented certain new and useful Improvements in Alternating-Current-Motor Winding and Regulation, (Case 22,) of which the following is a specification.

This invention relates to an alternating-current-motor winding, and has for its object to obtain a proportional and economical regulation of power for a motor working with constant pressure.

It is evident that to obtain efficiency and economical regulation it would be necessary that the current should vary with the load; but this is not easily obtained with a single source of alternating currents. Should I place the field-coils in the main circuit and not introduce a factor which causes variation of currents, then I would get at all times the same current flowing around the field, whether I need much or little power. The use of reacting coils is objectionable, because the currents created in said coils are not consumed, and cause heating of the core on account of the great work done to demagnetize it in rapid succession, especially where the heavy currents of the said reacting coils are circulating. In this motor-winding, which in particular refers to the winding of the field-magnet coils, the usual method has been abandoned, which consists in using for the field-magnet coils such a cross-section of wire which will carry the maximum current. On the contrary, the cross-section used is, with reference to the figure, about eight times too small. The motor-exciting circuit is divided into sub-coils. That coil or pair of coils which remains permanently in circuit or is first introduced into the circuit is of a cross-section much smaller than required for average working-current, and consists of such a length of wire that when the motor is doing no work the counter-pressure created by said coil or pair of coils will be equal, or nearly equal, to the pressure of the generator or equal to the pressure in the circuit. The other sub-coils may be of the same cross-section or vary therefrom, depending on special circumstances, such as the work required and the gradual or sudden increase of current desired under varying loads. If it is desired to increase the current, then I place two of the couples of sub-coils in parallel. The consequence will be that on account of doubling the cross-section the counter electromotive force in the exciting-circuit will drop and a larger current will circulate round the core, creating a more intense or concentrated magnetic field. To further increase the working capacity of the motor, a still heavier current would be required to circulate round the field. This is obtained by increasing the section of the wires in circuit still more by placing a third, a fourth, a fifth, &c., couple of sub-coils in parallel with those wires through which the current is passing. Thereby the self-induction of the exciting-circuit will be decreased still more. The consequence of the decrease of the resistance in a circuit of constant pressure will result in the circulation of a heavier current round the field-magnet poles. The greater the number of coils so connected in parallel the greater will be the current taken from the line or generator.

Figure 1 shows one method of winding; Fig. 2, an improved method; Figs. 3 and 4, a section of the conductor shown in Fig. 2.

Referring to the drawings, A is a generator of alternating or undulatory currents.

B and C are the conductors of the main or work circuit.

D is the armature of the motor.

E are the field-magnets of the motor.

F is the field-magnet winding.

1 1' 2 2' 3 3' 4 4', &c., are the subdivisions or coils of the winding F.

G are contact-blocks.

H are connecting-wires.

I is a contact-bar.

K are the motor-terminals.

L are sliding contact-rods.

M are insulating-handles.

N are the connecting-wires of the sub-coil couples.

The alternating-current generator A, which is self-exciting or is excited by any suitable source, sends its currents into the main conductors B and C. The motor is connected thereto in multiple arc, the line-current entering the motor-exciting coils at the terminals K K'. The motor-exciting winding is shown here subdivided into eight pairs of coils, a coil of one pole being connected in series with one coil of the other pole, the connections being made by means of wire N. The cross-sections of the said subdivisions may be the same in all cases or may be different. To have a greater range of variation of currents, the winding may be chosen in such a manner that as the number of coils placed in parallel increases also the cross-section of each successive or following couple of coils may have a larger sectional area; also, with regard to the resistance, it is not of great importance if the coils have not the same resistance; but it is preferred to have either uniform magnetization, or else the coils causing greatest magnetization are to be placed near the armature. The exciting-coils F F' are so subdivided that a coil on either pole is connected together in series and both in multiple with the main line or circuit. Coil 1 is connected to coil 1' by the wire N. The same is the case with the couples 2 2' 3 3' 4 4', &c. For conveniently introducing one or more couples into the work-circuit the said couples are connected to contact-blocks G G by connecting-wires H H. Parallel to contact-blocks G G are mounted the bars I, of good conducting material. On these bars are mounted the motor-terminals K K'. The connection between bars I and contact-blocks G is established by the sliding contact-bar L, which, by further advancing or withdrawing, may be caused to place more or less of the couples in parallel connection with the main circuit.

It is of course evident that the number of sub-coils is not limited to eight, but can be any desirable number, smaller or larger than eight. It is also evident that both the sliding contact-bars L can be made to act simultaneously by the connecting-rod R; but these are points of inferior importance, and are not claimed in this application.

The winding may be executed in a different way, either as shown in the figure by using different coils, which is the simplest method and the easiest to repair; secondly, by using stranded cable, and, thirdly, by placing the different wires (constituting the winding and organized to be coupled in multiple arc with one another) side by side and accomplishing the winding as if the independent wires were a band of metal, as is shown in Figs. 2, 3, and 4. Fig. 2 represents the same conditions as Fig. 1.

To show more clearly the method of winding with a cable, the latter has been shown excessively large and only wound in one layer; but it is well known that several layers or many layers will be required for apparatus to be used for commercial purposes. The section of the conductor is shown in Figs. 3 and 4. The dark lines round the wires indicate the insulation, all wires being totally independent from one another with respect to their electrical condition; but mechanically they are joined together to a common single conductor, which in this form may be used either as one conductor or as many independent conductors as there are wires. Both their free ends, like in Fig. 1, are connected to blocks G G, and the slide L L is adapted to act like a double-pole switch. Either it connects both ends simultaneously into the line or it disconnects simultaneously a wire with both its ends from the circuit.

I claim—

1. In an alternating-current motor, the combination of an armature having an independent circuit, a subdivided field-magnet wire, both the ends of each subdivision being open, and contact-slides for coupling all or less of the said subdivisions in multiple arc with one another to the work-circuit.

2. In an alternating-current motor, exciting-coils the size of wire of which is smaller than necessary for the full capacity of the motor, several such coils being fixed round the field-magnet cores of the said motor normally open on both ends, and contact slides or switches connecting the two ends of one or more of said coils by one operation in parallel to one another to the two main-line conductors.

3. In an alternating-current motor, exciting-coils made of a conductor whose cross-section is smaller than required for the full capacity of the motor, several coils being mounted on the same field-magnet core, having both ends open when the motor is at rest, and provided with a switch or contact-slide or similar means for coupling said coils in multiple arc with each other and to the main line.

4. An alternating-current motor having an exciting-coil arranged in sub-coils the terminals of which are normally open on both ends, a switch for connecting said sub-coils in multiple arc to each other and to the main line, and an armature-circuit independent from the field-exciting circuit.

5. An alternating-current motor having an exciting-coil consisting of several sub-coils mounted on the field-magnet core, the said sub-coils being normally open on both ends, and means for connecting the said coils in parallel with one another to the main line.

6. An alternating-current motor having an independent armature-circuit, exciting-coils consisting of a stranded cable, both ends of which are normally open, and means for connecting or disconnecting one or more of the strands of the said cable to the same generator.

7. An alternating-current motor having an independent armature-circuit, exciting-coils consisting of a stranded cable, both ends of which are normally open, and means for connecting all or less of said strands in parallel to one another to the generator.

8. In an alternating-electric-current-motor system, the combination of an alternating-current generator, a set of multiple exciting-coils mounted upon each arm of the field-magnet core of the said motor, electric conductors connecting the coils of the set on one arm with the coils of the set of the other arm, connecting them in pairs as to one terminal of each coil, and means for connecting a variable number of pairs of coils in multiple arc with one another to the generator.

9. In an alternating-current motor, exciting-coils consisting of a stranded cable, the strands being insulated from one another and having both ends normally open and connected to contact-blocks, a contact slide or switch adapted to connect a variable number of the said strands in parallel with one another and to a single source of generation.

In testimony that I claim the foregoing as my invention I have signed my name, in presence of two witnesses, this 16th day of February, 1889.

LUDWIG GUTMANN.

Witnesses:
WILLIAM C. RYAN,
DANIEL RYAN.